United States Patent [19]

Connaughton, Jr. et al.

[11] Patent Number: 4,929,455

[45] Date of Patent: May 29, 1990

[54] FLOUR-BASED POT PIE CRUSTS WITH IMPROVED TEXTURE

[75] Inventors: James M. Connaughton, Jr., Alworth, Ga.; James E. Sexton, Cincinnati, Ohio; James A. Hegener, Cold Spring, Ky.

[73] Assignee: Mallinckrodt, Inc., St. Louis, Mo.

[21] Appl. No.: 216,031

[22] Filed: Jul. 7, 1988

[51] Int. Cl.$^5$ .......................... A21D 8/00; A23L 3/00
[52] U.S. Cl. ........................................ 426/92; 426/94; 426/237; 426/241; 426/242; 426/243; 426/656
[58] Field of Search ................... 426/92, 94, 549, 656, 426/556, 241, 242, 243

[56] References Cited

U.S. PATENT DOCUMENTS

| | | |
|---|---|---|
| 2,102,623 | 12/1937 | Hanson . |
| 2,475,133 | 7/1949 | Farter et al. . |
| 2,508,477 | 5/1950 | Stievater, Jr. et al. . |
| 2,775,521 | 12/1956 | Mateles et al. . |
| 2,791,509 | 5/1957 | Cosler . |
| 2,913,347 | 11/1959 | Pfirrmann . |
| 3,032,422 | 5/1962 | Alikonis . |
| 3,100,710 | 8/1963 | Carlin . |
| 3,343,963 | 9/1967 | Kidoon . |
| 3,403,027 | 9/1968 | Page et al. . |
| 3,482,998 | 12/1969 | Carroll et al. . |
| 3,840,676 | 10/1974 | Yamamoto et al. . |
| 3,876,805 | 4/1975 | Craig et al. . |
| 4,198,438 | 4/1980 | Singer et al. . |
| 4,200,569 | 4/1980 | Ladbrooke et al. . |
| 4,396,635 | 8/1983 | Roudebrush et al. ............. 426/243 |
| 4,448,791 | 5/1984 | Fulde et al. . |

FOREIGN PATENT DOCUMENTS 46-30772 9/1971 Japan .
48-16179 5/1973 Japan .

OTHER PUBLICATIONS

Publication entitled "Functional Properties of Soy Proteins" by John E. Kinsella, J. Am. Oil Chemists' Soc., Mar. 1979, V. 56, pp. 242-258.

*Primary Examiner*—Donald E. Czaja
*Assistant Examiner*—Mary S. Mims
*Attorney, Agent, or Firm*—Wood, Herron & Evans

[57] ABSTRACT

Flour-based pot pies capable of forming a desirable flaky crust texture upon cooking in a microwave oven are produced by separately adding throughout the flour an effective amount of a protein having low affinity for water to make the crust dough.

11 Claims, No Drawings

FLOUR-BASED POT PIE CRUSTS WITH IMPROVED TEXTURE

FIELD OF THE INVENTION

This invention relates to flour-based microwavable foodstuffs having improved texture and mouth feel.

BACKGROUND OF THE INVENTION

A number of edible products found on the market today contain or are comprised of flour-based foodstuffs. Such foodstuffs exist as breads, pizza dough, and bakery goods, but also include coatings and breading for meat, vegetable and fruit products. Foodstuffs employed as coatings and breading are used in part to carry additional flavoring to the coated food product as well as to impart a desirable mouth feel and retain moisture. It is desirable that the flour-based foodstuffs have a texture which is firm, and yet flaky or crunchy depending on the intended application. Flour-based foodstuffs which are dense, watery, limp, or tough are considered unappetizing by the consumer and are thus commercially unacceptable. Typically, a flaky or crunchy texture in a flour-based foodstuff is formed by the addition of components, such as butter, shortening and other fat based materials into the flour-based foodstuffs. The result is that the uncooked dense flour-based foodstuff in the presence of convection cooking heat expands and dries to form discrete layers of flour-based material and thus creates a flaky or crunchy texture.

The problem of creating a flaky or crunchy texture in a flour-based foodstuff using a microwave oven is more difficult to solve. In contrast to a typical convection-type oven, the heat for cooking in a microwave oven is generated inside the flour-based foodstuff rather than above the surface of the foodstuff. Heat is supplied to the entire volume of the fluor-based foodstuff in a microwave oven rather than having the heat being applied only at the surface using the convection oven. Heating in the microwave is thus more uniform, and the temperature needed to cook is consequently lower, typically not exceeding the boiling point of water which is 212° F. (100° C.). The flaky or crunchy baked flour products formed in the convection oven by application of relatively high heat and evaporation of water do not form in a microwave oven. Rather, a flour-based foodstuff designed for heating in a convection oven will result in the formation of a mushy, pasty, unappetizing product when heated in a microwave oven.

This problem of formation of an unappetizing cooked flour-based foodstuff becomes more difficult to remedy when an aqueous flour-based foodstuff is to be frozen and then thawed before cooking. One reason for the problem is that the water in the foodstuff is somehow chemically or physically sorbed into the fluor-based component on storage. Further, the operation of freezing a flour-based foodstuff containing water causes the liquid water to form ice crystals having a larger volume than the water itself. Upon thawing and cooking, the ability of the foodstuff to form the flaky and crunchy texture is even further diminished. Presently available flour compositions are incapable of forming upon microwaving a flaky or crunchy texture.

It is known with reference to Yamamoto U.S. Pat. No. 3,840,676 to use a combination of zein and prolamine to coat the surface of a foodstuff, such as partially baked bread, for the purpose of binding the foodstuff and protecting it against oxidation and putrefication. When combined, the amino acid and prolamine undergo a gelation reaction and thus form a film on the surface of the coated foodstuff. Yamamoto claimed the process improved the color and luster of the bread surface and also decreased water loss from the bread.

SUMMARY OF THE INVENTION

The invention is directed to a flour-based pot pie in which the crust has an improved firm texture, especially when cooked using microwave radiation. According to this invention, flour-based pot pies demonstrating the improved crust texture upon microwave cooking contain in their crust a protein having a low affinity for water upon storage, especially frozen storage. The protein must be in the crust mass in an amount effective to produce a flaky or crunchy texture under the cooking conditions produced by microwave radiation. The protein having the required low affinity for water upon storage employed in this invention is exemplified by the class of proteins known as prolamines.

It has been found that the separate addition of an effective amount of low water-affinity zein or soy isolate protein in uniform mixture throughout a flour-based crust mixture, with or without a leavening agent, forms a cooked pie crust which has a very desirable firmness. The novel pot pies of this invention have utility in various applications. It has also been found that these novel pot pie crusts when formed into a dough with water can be cooked using microwave radiation to form a finished pot pie having a flaky or crunchy texture similar to that found in other flour-based pot pies cooked using a convection oven. Surprisingly, the pot pies of this invention may be frozen and microwaved in their frozen state to prepare very delectable, firm, flaky or crunchy pie crust products. The microwavable properties of these pies solve a long outstanding problem and will result in increased used of the microwavable pot pies.

Firmness throughout the pot pie crust is improved by the incorporation of an effective amount of the protein having low affinity for water upon storage. It has been found that a particular class of such proteins prevent the disadvantages of water sorption upon storage, especially frozen storage. The exact mechanism is not understood, but the empirical results speak for themselves. The texture improvement in the microwave cooked product whether by the creation of a flakier, crunchier crust or by the formation of a firmer crust having improved body, appears primarily a function of the level of low water-affinity protein added to the foodstuff ingredients. The type of firmness improvement will further depend on the entire composition of the foodstuff.

It has also been found that an effective amount of a metal ion, i.e., Na, Ca, K (and other alkali or alkaline earth metal ions) and the like metal ions, in conjunction with the low water-affinity protein produces the superior effect of crispiness and organoleptic properties. It is believed that an effective amount of the Na ion (or Ca, K, etc., metal ions) absorbs microwave energy thereby assisting in the heating of crust to enhance crispiness. The amount of such ions will vary with the composition of the entire crust.

DETAILED DESCRIPTION OF THE INVENTION

In its broader aspects the invention is directed to a flour-based pot pie consisting essentially of a food filling and a crust derived from an intimate mixture of flour and a protein having low affinity for water upon storage throughout its mass, said protein in an amount adapted to obtain, upon blending with water and cooking, a firm texture of said crust. The protein having low affinity for water upon storage is a prolamine derived from any of several food grains. The low water-affinity proteins derived from corn, soybeans, wheat or rye, and barley are known respectively as zein, soy isolate, gliadin, and hordein. Prolamines are obtained from gluten, which is a component of various cereal based flours. Flour consists essentially of a mixture of gluten and starch, and the prolamine is a low water-affinity component of the gluten. Prolamines are separated from gluten generally by extraction with alcohol such as ethyl and isopropyl alcohol. In the pure state, prolamines exist as light-coloed powders. The food filling for the pot pie in substantial part may comprise meat, fruit, dairy products or vegetables.

The flour-based pot pie crust containing an effective amount of the protein having low affinity for water upon storage is especially adapted for cooking upon application of microwave energy. The cooked product has a desirable flaky or crunchy texture. Further, as mentioned, the pot pie containing the protein having low affinity for water is capable of being frozen and stored at a temperature below 32° F. (0° C.). After thawing, the pot pie may be cooked directly using microwave energy to produce a cooked pie crust having a flaky or crunchy texture. Remarkably, the imroved crust texture obtained by cooking the pot pie of this invention using microwave energy is not adversely affected by freeze/thaw cycles.

While not desiring to be bound by theory, it is believed that pie crusts containing effective amounts of protein having low affinity for water upon storage have acceptable texture and freeze-thaw properties because the protein acts as a moisture absorption or adsorption inhibitor for the flour. The prolamine added to the flour is believed to coat or associate itself with the components of the grain to make them resistant to water sorption and to deleterious freeze-thaw effects due to the water. The flour grains thus retain their integrity in water and during freezing, and the resulting cooked pot pie crust has a desirable firmness, i.e., flaky or crunchy texture of acceptable firmness and percevied palatable dryness. After freezing, the pot pie of this invention may be stored in the frozen state for at least up to three months without adverse effect.

It has further been found that the effectiveness of the protein having low affinity for water upon storage in producing a flaky texture in a flour-based crust varies with the cereal grain from which the protein is extracted. The variation is due to the specific composition of the low water-affinity protein found in the various cereal grains. Thus, zein, derived from corn, is more effective than soy isolate, the protein derived from soybeans. Both of these proteins in turn perform more effectively than gliadin, the protein derived from wheat. Though the proteins vary in effectiveness based upon the feed stock grain, all demonstrated utility in producing a flour-based pot pie crust having a flaky or crunchy texture.

OPERATING EXAMPLES

The following detailed operating examples illustrate the practice of the invention in its most preferred form, thereby enabling a person of ordinary skill in the art to practice the invention. The principles of this invention, its operating parameters and other obvious modifications thereof will be understood in view of the following detailed procedure.

Operating Examples I through X

Fruit and pot pies containing a covering of a flour-based foodstuff were prepared. The pie covering formulations are listed below.

TABLE 1

| Component | Pie Covering Volume |
|---|---|
| All-Purpose Flour | 1 cup |
| Shortening | ⅓ cup |
| Salt | ½ tsp. |
| Water | 2–3 tbsp. |
| Crust Agent (selected from Table 2) | 6% by weight of above components |

TABLE 2

| | Crust Agent Weight (g) | | | | | | | | |
|---|---|---|---|---|---|---|---|---|---|
| Component | I | II | III | IV | V | VI | VII | VIII | IX |
| Maltodextrin | 196 | 190 | 178 | 182 | 182 | 183 | 124 | 185 | 184 |
| Zein | 216 | 210 | 196 | 400 | — | — | — | — | — |
| Flour | 314 | 305 | 285 | 45 | 291 | 292 | — | — | — |
| Butter Flavor | 167 | 190 | 244 | 227 | 177 | 143 | 177 | 146 | 144 |
| Baking Powder | 78 | 76 | 71 | 109 | 73 | 72 | 73 | — | — |
| Sodium Bicarbonate | 20 | 19 | 18 | 27 | 18 | — | 18 | 38 | — |
| Calcium Chloride | 10 | 10 | 9 | 9 | 9 | — | 9 | — | — |
| Soy Isolate | — | — | — | — | 250 | 251 | 599 | 621 | 614 |
| Fat Coated Sodium Bicarbonate | — | — | — | — | — | 59 | — | — | 58 |

The baking powder was a commercial blend of maltodextrin, sodium bicarbonate, sodium acid pyrophosphate and inert materials to improve the flow properties of the powder.

The crust agent of Table 2 was prepared by combining the dry components, which includes all the listed materials with the exception of the flavor component, which is a combination of one or more organic-soluble flavors in a fat base. After the dry components were combined and then blended for about 7 minutes, the flavor component was added. The mixture was then further blended for about 45 minutes. The resulting uniform mixture was passed thrugh a 10 mesh screen and readied for incorporation into the pie covering formulations.

The pie coverings were prepared according to the formula in Table 1 by combining the flour, salt, and crust agent and mixing until uniform. The water was then added to the dry mixture with additional mixing to ensure equal distribution of the water. Finally the shortening was folded into the mixture and mixed until a uniform dough was obtained.

Crust agent examples I through VI were combined with the pie covering components to form pot pie crust coverings. The pot pie filling was chosen from a group of commercially available diced meat/vegetable or diced chicken/vegetable fillings. Provided in Table 3 below are representative meat and chicken fillings for use as pot pie fillings.

TABLE 3

| Chicken Filling | (% by wt) | Beef Filling | (% by wt) |
|---|---|---|---|
| Chicken Broth | 37% | Beef Broth | 37% |
| Chicken Meat | 25 | Beef Pieces | 25 |
| Peas | 14 | Peas | 14 |
| Carrots | 14 | Carrots | 14 |
| Potatoes | 5 | Potatoes | 5 |
| Starch | 1.65 | Starch | 1.65 |
| Flavor | 1.00 | Flavor | 1.00 |
| Salt | 0.60 | Salt | 0.60 |
| Non-fat dry milk | 0.40 | Non-fat dry milk | 0.40 |
| Sugar | 0.50 | Sugar | 0.50 |
| Monosodium Glutamate | 0.40 | Monosodium Glutamate | 0.40 |
| Hydrogenated Vegetable Oil | 0.40 | Hydrogenated Vegetable Oil | 0.40 |
| Caramel Color | 0.03 | Caramel Color | 0.03 |
| Turmeric | 0.02 | Turmeric | 0.02 |
| | 100.0% | | 100.0% |

Crust agent examples VII through IX were incorporated with the pie covering components to produce fruit pie crust coverings. The specific fruit filling composition may be of cherry, apple or peach composition in aqueous sugar base. Provided in Table 4 below is a representative cherry fruit filling for use as a pie filling.

TABLE 4

| Cherry Fruit Filling | (% by wt) |
|---|---|
| Dark Sweet Cherries | 40.0 |
| Water | 33.26 |
| High Fructose Corn Syrup | 20.00 |
| Granular Sugar | 3.00 |
| Modified waxy maize starch | 2.50 |
| Sodium Alginate | 0.89 |
| Salt | 0.15 |
| Potassium sorbate | 0.10 |
| Citric Acid, anhydrous | 0.10 |
| FD&C Red #40 | to suit |
| | 100.0% |

An example X, containing the pie covering components of Table 1 with no crust agent was run as a comparison. The food filling of each of these examples was introduced into an acceptable microwave pie pan and was formed into a covering about ¼" to ½" thick over the filling.

After formulation of the pie coverings, each pie corresponding to the crust agent examples was then frozen for a minimum of 24 hours. The frozen pies were then removed directly to a microwave oven and individually cooked. The pot pies were cooked for about 9 to 10 minutes at full microwave power, while the fruit pies were cooked for about 6 to 7 minutes at full power.

The pies containing zein or soy isolate had flaky crusts after only microwave cooking, in both the pot pie and fruit pie configurations. Example X produced without any added low water-affinity protein formed a doughy, mushy pie covering after microwave cooking.

Operating Examples XI through XIV

To further demonstrate the beneficial effects due to the use of a low water-affinity protein upon storage in flour-based microwave foodstuffs, pot pie crusts were prepared using protein with leavening agents, using protein without leavening agents, and using neither protein nor leavening agents.

Table 5 below lists the components for the various formulations.

TABLE 5

| Pot Pie Crust XI (no protein/no leavening) | |
|---|---|
| | (% by wt) |
| Flour | 52.0 |
| Salt | 1.5 |
| Dextrose | 2.5 |
| Hydrogenated Shortening | 26.0 |
| Water | 18.0 |
| | 100% |

| Pot Pie Crust XII (protein/no leavening/additional salt) | |
|---|---|
| | (% by wt) |
| Flour | 46.0 |
| Soy Protein | 5.75 |
| Salt | 1.75 |
| Dextrose | 2.5 |
| Hydrogenated Shortening | 26.0 |
| Water | 18.0 |
| | 100% |

| Pot Pie Crust XIII (protein/leavening) | |
|---|---|
| | (% by wt) |
| Flour | 46.0 |
| Soy Protein | 5.77 |
| Salt | 1.5 |
| Calcium Carbonate | 0.23 |
| Dextrose | 2.5 |
| Hydrogenated Shortening | 26.0 |
| Water | 18.0 |
| | 100% |

| Pot Pie Crust XIV (protein/leavening) | |
|---|---|
| | (% by wt) |
| Flour | 45.81 |
| Soy Protein | 5.77 |
| Sodium Bicarbonate | 0.24 |
| Sodium Acid Pyrophosphate | 0.18 |
| Salt | 1.5 |
| Dextrose | 2.5 |
| Hydrogenated Shortening | 26.0 |
| Water | 18.0 |
| | 100% |

| Pot Pie Crust XV (protein/no leavening/no additional salt) | |
|---|---|
| | (% by wt) |
| Flour | 46.42 |
| Soy Protein | 5.58 |
| Salt | 1.5 |
| Dextrose | 2.5 |

TABLE 5-continued

| | |
|---|---|
| Hydrogenated Shortening | 26.0 |
| Water | 18.0 |
| | 100% |

The ingredients for each formulation were combined in the following manner. The dry components were weighed and mixed until uniform. The shortening was then folded into the dry mix and stirred until uniform. Then, water was added and thoroughly mixed with the dry mix containing shortening. The resulting dough mass for each formulation was then formed into a circular top crust, added to a conventional 8 oz. pot pie and then stored in a freezer for at least about 48 hours.

The frozen pot pies were later removed from storage and cooked in a 600 watt microwave oven for about 9 mins. Optionally the formulaions may contain flavoring.

The cooked crust sheets were evaluated for crispness and firmness. The crusts containing soy protein were detectably more crips than crust XI having no protein and no leavening agents, crust XI being watery and lacking in firmness. Crust XII having soy protein without any leavening agents was judged to be the crispest, most preferred cooked foodstuff. Crust XV with only protein and no leavening/additional salt was not quite as crispy as XII, but still a satisfactory product. Crust XIV, with leavening, and crust XIII were judged to be less crispy than crust XII, but preferred over crust XI. Crust XI was consisently graded as least acceptable.

The above examples and other comparative tests not shown herein demonstrate that an effective amount of a metal ion, i.e., Na, Ca, K (and other alkali or alkaline earth metal ions) and the like metal ions, in conjunction with the protein produces the superior effect of crispiness and organoleptic properties. For instance, crust XIV which contains leavening (and hence Naa ions), but no additional Na ions as NaCl (1.5 parts versus 1.75 parts of Crust XII) is not judged to be as good as XII. In other words, the basicity of leavening and the lesser amounts of Na ion do not provide as crispy or organoleptically acceptable crust as XII in this series of examples. Perhaps, the leavening action itself tends to lessen crispiness. Similarly, XIII with less salt than XII is not as crispy. Crusts XIII and XIV are still acceptable products in accordance with this invention. However, it is believed that an effective amount of the Na ion (or Ca, K. etc., metal ions) absorbs microwave energy thereby assisting in the heating of crust to enhance crispiness. The amount of such ions will vary with the composition of the entire crust.

The above comparative runs demonstrate the pot pie crust texture improving effect obtained by incorporating an effective amount of a protein having low affinity for water upon storage in microwavable flour-based pot pies. Additional experiments not detailed here were conducted wherein specific components of flour-based crust formulations were deleted and the resulting cooked pies evaluated. Pot pie crusts were prepared deleting only the low water-affinity protein, only the fat component, and only the leavening agent component. When the low water-affinity protein was deleted, the cooked pie was mushy and lacking in firmness. Deletion of either the fat or the leavening agent in the presence of the low water-affinity protein still resulted in a cooked pot pie which had acceptable crust texture. Thus, the low water-affinity protein contributed substantially to the acceptable texture of the tested microwaved pot pies. For the above listed pot pie crusts, the protein was incorporated at a level of from about 1% to about 10% by weight based upon the total weight. Because of the wide range of flour-based pot pies which may be prepared, the effective level of protein having low affinity for water upon storage may need to be raised or lowered outside the express weight range tested to obtain the desired crust texture improvement.

Thus, by means of employing a low water-affinity protein upon storage such as a prolamine in an effective amount in a flour-based pot pie, one can prepare in a microwave oven a cooked pot pie which has a flaky or crunch crust texture without the watery or mushy properties which previously characterized such cooked products. The invention addresses and solves a problem of long-standing duration encountered in the area of microwave cooking. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A microwavable flour-based pot pie comprising a food filling and a flour-based crust composition made from a dough consisting essentially of an intimate mixture of flour and a protein having low affinity for water upon storage separately added thereto throughout said mixture, said protein selected from the group of zein, soy isolate, gliadin, hordein or mixtures thereof in an amount adapted to obtain a firm texture throughout the crust composition upon microwave cooking.

2. The pot pie of claim 1 further containing a metal ion in an amount effective to absorb microwave energy and enhance the texture.

3. The pot pie of claim 1 wherein said pie is storable at freezing temperatures and thereafter microwavable in its frozen state until cooked.

4. The pot pie of claim 1 wherein said food filling in substantial part comprises meat, fruit, dairy products or vegetables.

5. The pot pie of claim 1 wherein said protein amount is in the range of about 1% to about 10% by weight.

6. The pot pie of claim 1 wherein said composition contains a leavening agent.

7. A microwavable flour-based pot pie comprising a food filling and a flour-based crust composition capable of storage at freezing temperatures which upon application of microwave energy in its frozen state results in a cooked pot pie having a firm flaky texture throughout said crust composition, said crust composition made from a dough consisting essentially of a uniform mixture of flour, leavening agent and a protein having low affinity for water separately added thereto throughout said mixture, said protein selected from the group of zein, soy isolate, gliadin, hordein or mixtures thereof in an amount adapted to obtain a firm flaky texture throughout said crust composition upon microwave cooking.

8. The pot pie of claim 7 further containing a metal ion in an amount effective to absorb microwave energy and enhance the texture.

9. The pot pie of claim 7 wherein said protein amount is in the range of about 1% to about 10% by weight.

10. A method of cooking the pot pie of claim 1 by microwave heating.

11. The method of cooking the pot pie of claim 7 comprising storing said pot pie at freezing temperatures, placing it in a frozen state in a microwave oven and thereafter microwaving until cooked.

* * * * *